C. C. GATES.
AUTOMOBILE FAN BELT.
APPLICATION FILED SEPT. 27, 1917.
1,307,731.
Patented June 24, 1919.
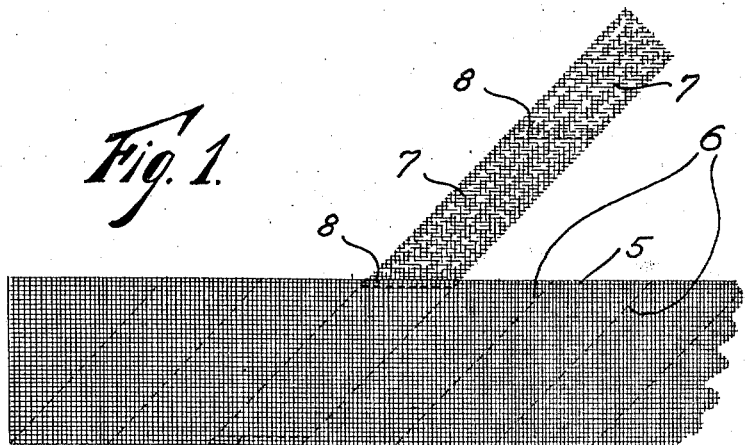
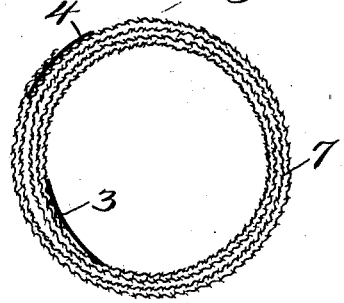
Fig. 5.
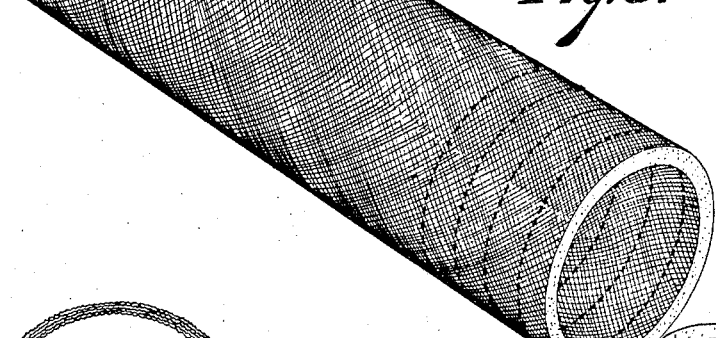
Fig. 3.
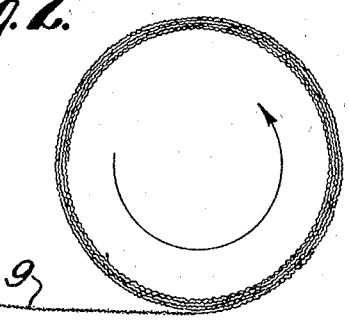
Fig. 2.
Fig. 4.
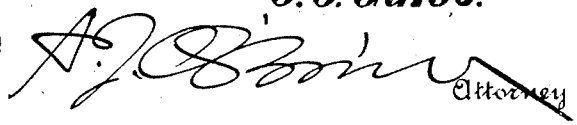
Inventor
C. C. Gates.
By A. J. O'Brien
Attorney

UNITED STATES PATENT OFFICE.

CHARLES C. GATES, OF DENVER, COLORADO, ASSIGNOR, BY MESNE ASSIGNMENTS, TO THE GATES RUBBER COMPANY, OF DENVER, COLORADO, A CORPORATION OF COLORADO.

AUTOMOBILE-FAN BELT.

1,307,731.  Specification of Letters Patent.  Patented June 24, 1919.

Application filed September 27, 1917. Serial No. 193,527.

*To all whom it may concern:*

Be it known that I, CHARLES C. GATES, a citizen of the United States, residing at the city and county of Denver and State of Colorado, have invented certain new and useful Improvements in Automobile-Fan Belts; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in belts which are well adapted for use in connection with the fans of automobiles, but which may be employed in any relation where a belt of predetermined length is required. My improved belt is of the class where relatively short connections are made between pulleys, though, of course, the belt may be made of considerable length if desired. This belt consists of superposed layers of rubberized fabric whose warp and woof are diagonal to its length, the belt being vulcanized in endless annular form.

The belt is made by cutting strips of material from woven rubberized fabric, the strips being cut diagonal to the lengthwise direction of the warp threads of the fabric, so that when the said strips are connected to form a relative long sheet, the warp and woof are diagonal to the length of the sheet. This sheet is wound into a roll and unwound therefrom to produce the desired number of superposed layers upon a core, the thickness of the belt determining the number of layers employed. In this manner a cylindrical belt member is formed having a diameter equal to that of the core or drum upon which it is wound. The belt member while on the core is then placed in a vulcanizer and cured, after which the belt member which has an axial length approximately equal to that of the width of the sheet of the rubberized fabric employed in making it, is cut into a series or number of belts of the desired width. Of course, in making belts of this character the core or cylindrical drum must vary according to the length of the belt. In starting the rubberized fabric upon the core, a strip of raw gum or vulcanizable material is applied to the drum and this is partly overlapped by the starting edge of the fabric so that when the first convolution is completed, the adjacent part of the fabric will also overlap a part of this raw gum, thus sealing the first convolution so that when the article is vulcanized it will be substantially integral. Furthermore, when the last convolution is completed and the rubberized fabric severed, a strip of raw gum is applied to the body of the member and is overlapped by the free edge of the fabric. In this way, both end edges, that is the beginning and terminal edges of the fabric, when the member is vulcanized are substantially integral with the adjacent part of the fabric. In this way belts are produced of the character heretofore indicated. One object of cutting the fabric so that the warp and woof form oblique angles to the lengthwise direction of the sheet, is to give a limited degree of elasticity to the belt as distinguished from an article which is absolutely rigid and non-elastic, the latter condition obtaining where the warp threads extend lengthwise of the belt, since these threads are not elastic and consequently, form a non-elastic and non-yielding belt. It has been found by actual practice that it is exceedingly important that belts of this character have a limited degree of elasticity, so that they will yield slightly before breaking. This characteristic greatly increases the durability and general efficiency of the belt. Furthermore, by reason of the fact that the warp and woof are arranged diagonally or to form oblique angles with the lengthwise direction of the belt, the ends of the warp and woof threads only are exposed on the edges of the belt, thus preventing the belt from fraying or raveling out at the edges and obviating the necessity of applying a binding to these edges, while at the same time the belt is given the desired degree of elasticity or that necessary to maximum durability and efficiency.

Having briefly outlined the invention, I will proceed to describe the same in detail, reference being made to the accompanying drawing in which is illustrated an embodiment thereof. In this drawing:

Figure 1 is a top plan view of a normal sheet of rubberized fabric having dotted lines, indicating the manner of cutting this sheet into strips in order to form a sheet whose warp and woof form oblique angles to the direction of its length, the last named sheet being indicated as extending both above and below the normal sheet and forming a continuation of one of the widths of the normal sheet spaced by dotted lines.

Fig. 2 is an end elevation illustrating the manner of winding the rubberized fabric to produce the member shown in Fig. 3.

Fig. 3 is a perspective view of a cylindrical belt member from which a series of belts of suitable width may be cut.

Fig. 4 is a perspective view of one of the completed belts which it is assumed is cut from one end of the member shown in Fig. 3.

Fig. 5 is an end elevation of the cylindrical belt member, illustrating the manner of securing the inner and outer terminal edges of the fabric by strips of raw gum, preparatory to vulcanization.

The same reference characters indicate the same parts in all the views.

Let the numeral 5 designate a normal sheet of woven rubberized fabric, that is to say, having the warp parallel with the direction of the length of the sheet and the woof at right angles thereto. The dotted lines 6 in this view indicate the direction of cut in order to form a series of lengths 7 of rubberized fabric having the warp and woof threads arranged diagonally to the length of the sheet. These strips or parts 7 after being cut from the normal sheet 5, are connected as indicated by the dotted lines 8 by slightly overlapping the adjacent edges of the two strips or parts 7, the rubberized fabric being sufficiently adhesive for the purpose. The sheet, which I will designate in its entirety by the numeral 9, after being formed in the manner indicated is wound to form the belt member 10 (see Fig. 3), having both its inner and outer edges sealed by strips of raw vulcanizable material. In Fig. 5 the numeral 3 designates the inner sealing strip, and the numeral 4 the outer sealing strip, of such material, prior to vulcanization. This belt member is then vulcanized and afterward cut or subdivided to form a series of belts 12, the warp and woof of which form oblique angles to the direction of its length, as indicated by the interior and exterior shading in Fig. 4. This shading is also indicated in Fig. 3. In Fig. 2 I have illustrated the manner of winding the sheet 9 to form the member 10, though the latter in Fig. 2 is only partially completed. A core, of course, must be employed for this purpose, but this core is fully illustrated and described in my simultaneous applications entitled belt making apparatus and belt making process, respectively.

Having thus described my invention, what I claim is:

1. A belt comprising superposed layers of rubberized woven fabric whose warp and woof are diagonal to its length, said belt being vulcanized in endless annular form.

2. A belt composed of convoluted layers of rubberized woven fabric whose warp and woof form oblique angles to its length, said belt being vulcanized in endless annular form.

3. An endless vulcanized belt composed of layers of rubberized woven fabric whose warp and woof form oblique angles to its length.

4. A vulcanized belt composed of convoluted layers of rubberized woven fabric whose warp and woof form oblique angles to its length, said belt being free from joints and homogeneous in structure throughout its length.

5. An endless vulcanized belt, composed of convoluted layers of rubberized woven fabric, the inner and outer end edges of the fabric being secured to the body of the belt by strips of vulcanizable material.

6. A belt, vulcanized in endless form and composed of convoluted layers of rubberized woven fabric, the inner end edge of the fabric being secured to the body of the belt by vulcanizable material.

7. A belt, composed of a series of convolutions of rubberized material, vulcanized in endless form, the outer end edge of the fabric being secured to the body of the belt by vulcanizable material.

8. An endless vulcanized belt composed of vulcanized material and convoluted layers of fabric, said belt being without a joint and substantially homogeneous in structure throughout its length.

9. An endless vulcanized belt composed of convoluted layers of rubberized fabric, said belt being without a joint and substantially homogeneous in structure throughout its length.

In testimony whereof I affix my signature.

CHARLES C. GATES.